United States Patent Office 3,314,654
Patented Apr. 18, 1967

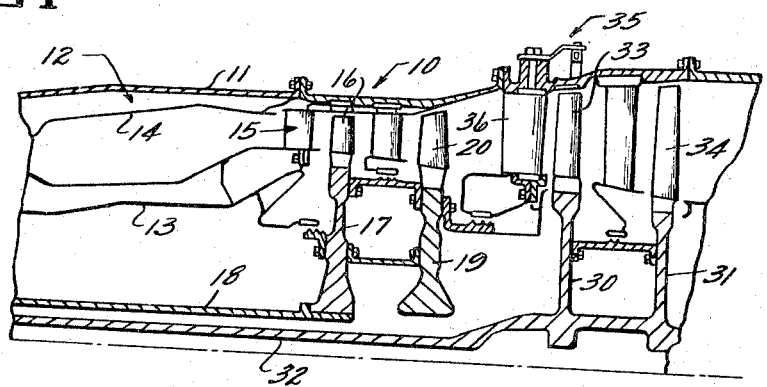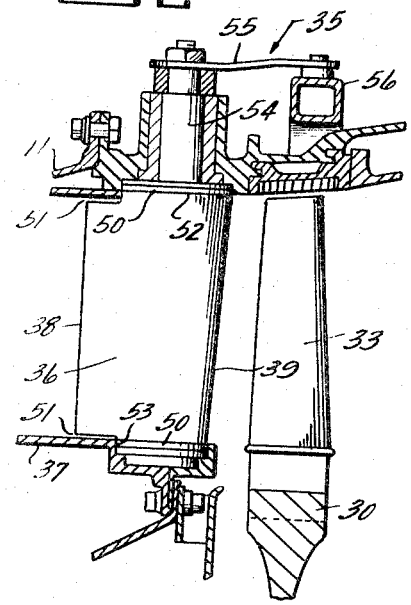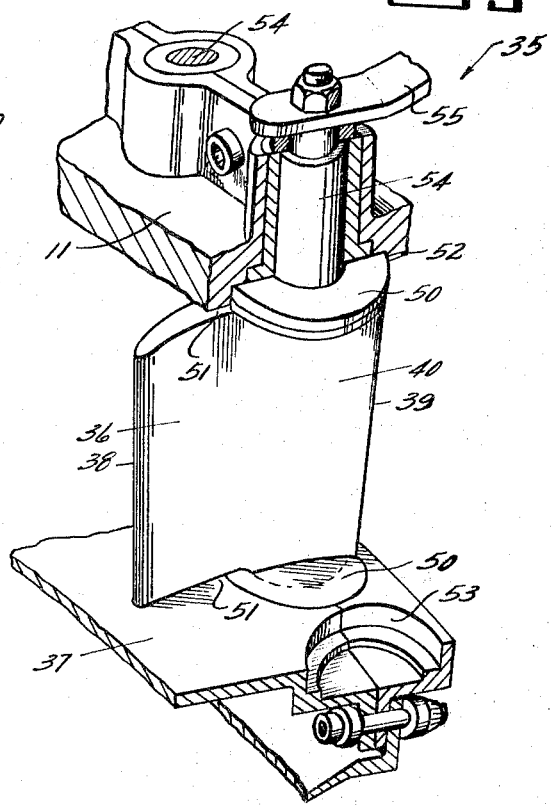

3,314,654
VARIABLE AREA TURBINE NOZZLE FOR AXIAL FLOW GAS TURBINE ENGINES
Georges Spencer Thenault, Salem, and Robert Hirschkron, Marblehead, Mass., assignors to General Electric Company, a corporation of New York
Filed July 30, 1965, Ser. No. 476,137
2 Claims. (Cl. 253—78)

This application is a continuation-in-part of applicants' copending application entitled, "Adjustable Stator Vanes," Ser. No. 327,300, filed Dec. 2, 1963, and now abandoned, and assigned to the assignee of this invention.

This invention relates to a variable area turbine nozzle for axial flow gas turbine engines and, more particularly, to a novel vane shrouding arrangement for reducing leakage to an extremely low level previously unattainable in variable area nozzles having a solidity ratio of 1 or greater.

In an axial flow gas turbine engine, motive fluid is compressed in the engine compressor from which it is directed downstream to a combustor where the energy of the motive fluid is increased greatly by the combustion process, the resulting products of combustion then being supplied to a gas generator turbine which is mechanically coupled to and drives the compressor. After sufficient energy for sustaining the compression process is extracted by the gas generator turbine, the products of combustion are directed to either an exhaust nozzle or a power turbine. In a "turbojet" engine of the type commonly used for aircraft propulsion, the products of combustion are supplied to an exhaust nozzle as a high velocity jet, the velocity of the issuing jet providing the propulsive thrust. In engines of the type known as "turboshaft" engines, the products of combustion are supplied to a power turbine coupled by an output shaft to a driven load. Turboshaft engines in which the power turbine drives a propeller are also utilized for aircraft propulsion, such engines also being known as "tuboprops" or "prop-jets."

It is well known to those skilled in the art that greater shaft output horsepower from a turboshaft engine and greater output thrust from a turbojet engine can be obtained by increasing the temperature at which the combustion products are supplied to the turbine by the turbine nozzle. Therefore, in order to obtain maximum output from the engine, it is common to design the engine such that the highest possible turbine temperature is attained at full power, this being particularly true in the design of turbine engines used for aircraft propulsion where a high power output to weight ratio is desirable. The maximum temperature attainable is limited by the high temperature capabilities of the various turbine elements, these capabilities being determined primarily by the materials and the cooling system used in the turbine. In typical gas turbine engines designed in this manner to operate at the maximum possible temperature at full power, the turbine temperature under part power conditions is generally substantially below the maximum allowable temperature. As a result, engine efficiency during part power operation is low; this generally unsatisfactory efficiency level is particularly undesirable in regenerative engines intended to operate at part power for extended periods of time.

The efficiency at part power can be increased by increasing the turbine inlet temperature at part power. This can be accomplished by adujsting the positions of the vanes comprising the turbine nozzle to vary the flow area therethrough, the flow area being decreased under part power conditions to increase the turbine inlet temperature. A common structural arrangement by which the positions of the vanes and therefore the flow areas between adjacent vanes may be varied includes spindles at one or both ends of the vanes about which the vanes can be pivoted to position the vanes in accordance with design requirements. When this type of variable area turbine nozzle construction is used, there necessarily are small clearances between the ends of the vanes and the walls of the motive fluid passageway in which the vanes are disposed. In axial flow turbines, these clearances must be sufficiently large to permit adjustment of the vanes to all of the various operative positions without interference between the ends of the vanes and the cylindrical turbine casing at any of the positions. Consequently, in axial flow turbines these clearances are, at most vane settings, substantially larger than the corresponding clearances in radial flow turbines where the end clearances need only be large enough to facilitate assembly and to accommodate thermal growth during turbine operation. It has been found that this end clearance permits leakage between the high and low pressure sides of the vanes, the result being inefficient operation under both full load and part load conditions. Because of the large clearances required in order to avoid interference, this leakage and the accompanying loss in efficiency can reach substantial levels in axial flow turbines. This situation has been alleviated in the past by covering the entire ends of the turbine nozzle vanes with circular platforms or shrouds secured thereto and then pivoting the vanes about the centers of the circular platforms. In this manner, the end clearances are eliminated. Unfortunately, however, this solution to the problem can be used only on vanes having a solidity of less than 1, solidity being the ratio of the vane chord to the pitch or spacing between adjacent vanes. Leakage has thus remained a problem with respect to turbine nozzle assemblies in which the solidity is 1 or greater since the entire ends of vanes cannot be shrouded without creating interference between adjacent shroud platforms.

It is therefore an object of this invention to provide an improved variable area turbine nozzle for axial flow gas turbines by which leakage is held to a minimum during turbine operation.

Another object of this invention is to provide improved means for reducing leakage in axial flow variable area turbine nozzles in which the solidity, or ratio of vane chord to spacing between vanes, is greater than 1.

A further object of this invention is to substantially reduce leakage in variable area turbine nozzles for axial flow gas turbine engines without reducing the normal clearance at the ends of the nozzle vanes below that required to facilitate assembly, to accommodate thermal growth during machine operation, and to permit adjustment of the vanes wtihout interference.

A still further object of this invention is to provide relatively simple and dependable means for controlling the leakage characteristics of axial flow variable area turbine nozzles without adding substantially to either the expense of manufacture or the complexity of the machine.

Briefly stated, in carrying out the invention in one form, the variable area turbine nozzle of an axial flow turbine is provided with a plurality of circumferentially spaced radially extending nozzle vanes, the circumferential spacing between adjacent vanes being less than the chord length of the vanes. In accordance with the invention, the ends of the vanes are provided with the maximum possible shrouding in the most effective manner. More particularly, each end of each vane has a circular platform secured thereto. The diameters of the platforms are as large as possible, but are necessarily less than the spacing between adjacent vanes. To provide maximum effectiveness, the vanes extend across diametral portions of the circular platforms, and the platforms are axially located between the leading and trailing edges of the associated vanes in the region in which the pressure gradient between the two sides of the vane is greatest during turbine operation. More specifically, this region of maximum pressure gradient in the turbine nozzle is at the trailing edge portions of the vanes. To vary the flow area of the variable area turbine nozzle, means are provided for supporting and pivoting the vanes about the centers of revolution of the circular platforms.

The novel features of this invention are set forth with particularity in the appended claims. The invention, however, both as to organization and method of operation, together with further object sand advantages thereof, may best be understood by reference to the following description taken in connection with the accompanying drawings in which:

FIGURE 1 is a sectional view of the high temperature turbine portion of a gas turbine engine;

FIGURE 2 is an enlarged view of a portion of the engine shown by FIGURE 1 illustrating a variable area turbine nozzle utilizing this invention;

FIGURE 3 is a perspective view of the variable area turbine nozzle of FIGURE 2;

Figure 4:
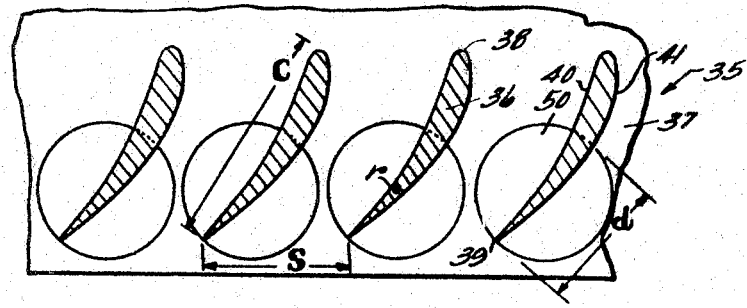
FIGURE 4 is a sectional view of the turbine nozzle of FIGURES 2 and 3.

Referring to the drawings, and particularly to FIGURE 1, a portion of a turboshaft engine 10 is illustrated, the engine having an outer cylindrical casing 11. An annular combustor indicated generally by 12 is defined between the casing 11 and an inner wall 13, and an annular combustion liner 14 within which the actual combustion occurs is located in the combustor 12. An annular fixed area nozzle diaphragm having fixed vanes is indicated generally by 15 in FIGURE 1 and is located at the downstream end of the combustion liner 14 for supplying the hot products of combustion to a row of turbine buckets 16 at the proper velocity and at the proper angle. The turbine buckets 16 are peripherally mounted on a turbine wheel 17 which, along with its associated shaft 18 and a second turbine wheel 19 having buckets 20 mounted thereon, is rotatably mounted within the engine 10 by suitable mounting means not illustrated. The turbine unit comprising the wheels 17 and 19 and the shaft 18 is commonly referred to as the gas generator turbine and drives the compressor (not shown) of the engine 10.

The turboshaft engine illustrated by FIGURE 1 has a power turbine unit downstream of the turbine wheel 19, the power turbine unit having a second set of turbine wheels 30 and 31 secured to a second shaft 32 which is concentric with the gas generator shaft 18. The shaft 32 is connected to a load (not shown) such as a propeller in the case of a turboprop engine. Peripheral rows of turbine buckets 33 and 34 are mounted on the wheels 30 and 31 respectively. A variable area turbine nozzle 35 constructed in accordance with the present invention supplies the combustion products exhausted from the gas generator turbine to the power turbine at the proper temperature, velocity, and angle.

As pointed out previously, variable area turbine nozzles have been used in the past to maintain engine efficiency under part power conditions by decreasing the nozzle flow area and thereby increasing the part power turbine temperature. In such assemblies, particularly those having a solidity greater than 1, leakage between the high and low pressure sides of the airfoil shaped nozzle vanes has been a problem, the pressure on the convex side being substantially lower than that on the concave side. As a result, the convex side is often called the "suction side" and the concave side is called the "pressure side." It will be noted from FIGURE 5, however, that in a turbine nozzle the pressure drop between the pressure and suction sides is not uniform along the entire chord width of the nozzle vane, the pressure gradient being greatest adjacent the trailing edge portion of the vane.

The novel arrangement of this invention makes use of this non-uniformity of pressure drop to reduce substantially from levels heretofore attainable the leakage between the pressure and suction sides of variable area turbine nozzles having a solidity greater than 1.

Referring now to FIGURES 2-4 for the specific details of the illustrated embodiment, it will be seen that the variable area turbine nozzle 35 is comprised of a plurality of circumferentially spaced radially extending vanes 36 traversing the annular fluid flow passageway formed between the engine casing 11 and a concentric inner wall 37. As best illustrated by FIGURE 4, the vanes 36 have axially spaced leading and trailing edges, the leading edge 38 being rather blunt and the trailing edge 39 being tapered. A concave side wall 40 and a convex side wall 41 join the leading and trailing edges to develop an aerodynamic airfoil shape. During turbine operation, the pressure distribution on the concave and convex side walls 40 and 41 and the pressure drop therebetween is as described above and shown by FIGURE 5.

As illustrated by FIGURE 4, the circumferential spacing S between the adjacent nozzle vanes 36 is less than the chord width C, the distance between the leading and trailing edges of the vanes. Since the solidity is thus greater than 1, it is not possible to cover the entire ends of the vanes with circular platforms to prevent leakage between the pressure and suction sides. However, in accordance with the present inventory, the maximum possible shrouding effect is provided by circular platforms 50 which are positioned on the ends of the vanes 36. These platforms 50 have the largest possible diameters $d$; the diameter $d$ is, of course, just slightly less than the spacing S. Furthermore, the platforms 50 are located in the region in which the pressure drop between the pressure and the suction sides is greatest; in other words, the platforms are located as illustrated by FIGURE 4 at the trailing edge 39. Finally, the ends of the vanes 36 extend across the maximum possible portion of the platforms 50. As shown, the vanes span diametrical portions of the platforms 50 and thus extend across the centers of revolution $r$.

Referring now to FIGURES 2 and 3, circular recesses 52 and 53 are provided in the engine casing 11 and the inner wall 37, respectively, for receiving the circular platforms 50. Spindles 54 are connected to the platforms 50 received in the casing recesses 52 for rotating the platforms 50, and, consequently, the vanes 36 about the centers of revolution $r$ of the platforms. The individual spindles 54 are connected by suitable linkage means 55 to an annular unison ring 56 surrounding the engine 10. By moving the unison ring 56 in a desired manner, the positions of the vanes 36 comprising the variable area turbine nozzle 35 can be varied to maintain a desired operating temperature under part power. The positions of the vanes can also be varied to provide desired operating characteristics at full power.

Figure 5:
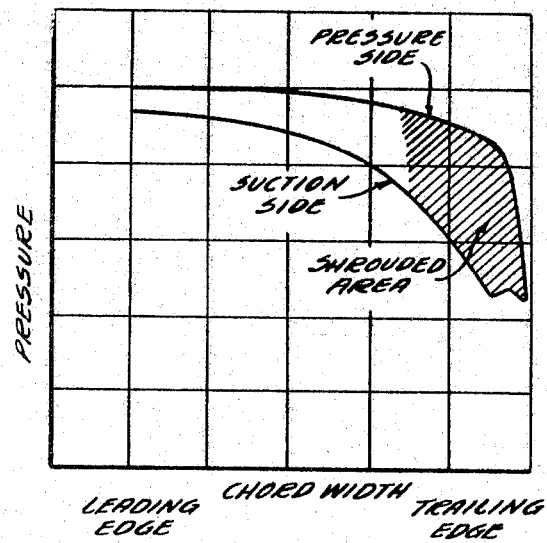
FIGURE 5 is a graphical illustration of the pressure distribution on the surfaces of the turbine nozzle vanes.

As best illustrated by FIGURE 2, clearances 51 are provided between the ends of the vanes 36 adjacent the leading edges 38 and the engine casing 11 and the inner wall 37, this clearance being necessary to permit angular adjustment of the vanes 36 to all operative positions without causing interference between the vanes 36 and the cylindrical casing 11, to facilitate assembly during manufacture, and to accommodate thermal expansion. It will therefore be obvious that these clearances 51 may be substantial at some vane positions during engine operation. Even so, however, the leakage which results is relatively insignificant since as shown by FIGURE 5, the pressure gradient is not great in the region adjacent the leading edges 38. In this manner, the shrouding arrangement of this invention maintains low leakage when shrouding of the entire ends of the vanes is not feasible.

It is thus seen that the invention substantially reduces leakage in variable area turbine nozzles having solidity greater than 1 without reducing the normal end clearance below that required to facilitate adjustment and assembly and to accommodate thermal growth during machine operation.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. In an axial flow gas turbine, a variable area turbine nozzle comprising:

wall means defining an annular fluid flow passageway through which high temperature motive fluid is supplied to said turbine, a plurality of circumferentially spaced radially extending vanes traversing said passageway with the ends of the vanes in proximity to said wall means, each of said vanes having a concave side wall and a convex side wall connecting axially spaced leading and trailing edge portions to form an airfoil shaped cross section, the circumferential spacing between adjacent ones of said vanes being substantially less than the chord length of said vanes, a plurality of circular platforms having radially extending centers of revolution, each end of each of said vanes having one of said circular platforms secured thereto adjacent and limited to the trailing edge portion of the associated vane, portions of the ends of said vanes extending across diametral portions of said circular platforms, a plurality of circular recesses in said wall means, each of said recesses receiving a respective one of said circular platforms for location therein, and actuating means connected to each of said vanes for pivoting said vanes about the centers of revolution of said circular platforms to vary the flow areas between adjacent ones of said vanes, whereby effective shrouding is provided for preventing leakage between the concave and convex sides of the vanes in the high pressure gradient region adjacent the trailing edge portions.

2. A variable area turbine nozzle as defined by claim 1 in which adjacent circular platforms are in proximity to provide the maximum possible shrouding of the ends of the vanes.

References Cited by the Examiner

UNITED STATES PATENTS

| 1,478,053 | 12/1923 | Overn | 253—122 |
| 2,988,327 | 6/1961 | Trowbridge et al. | 253—59 |

FOREIGN PATENTS 249,188   2/1961   Australia.

MARTIN P. SCHWADRON, *Primary Examiner.*

SAMUEL LEVINE, EDGAR W. GEOGHEGAN, SAMUEL FEINBERG, *Examiners.*

E. A. POWELL, Jr., *Assistant Examiner.*